(12) United States Patent
Garvey et al.

(10) Patent No.: US 12,499,591 B2
(45) Date of Patent: Dec. 16, 2025

(54) PVS OVER UDP FOR SPLIT RENDERING

(71) Applicant: QUALCOMM Incorporated, San Diego, CA (US)

(72) Inventors: Joseph Daniel Garvey, San Diego, CA (US); Bojan Vrcelj, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 390 days.

(21) Appl. No.: 18/168,532

(22) Filed: Feb. 13, 2023

(65) Prior Publication Data

US 2024/0104794 A1 Mar. 28, 2024

Related U.S. Application Data

(60) Provisional application No. 63/377,001, filed on Sep. 23, 2022.

(51) Int. Cl.
*G06T 1/60* (2006.01)
*G06T 7/00* (2017.01)
*G06T 7/49* (2017.01)
*G06T 11/00* (2006.01)

(52) U.S. Cl.
CPC .............. *G06T 11/001* (2013.01); *G06T 1/60* (2013.01); *G06T 7/0002* (2013.01); *G06T 7/49* (2017.01); *G06T 2207/10016* (2013.01); *G06T 2207/30168* (2013.01)

(58) Field of Classification Search
CPC ....... G06T 11/001; G06T 1/60; G06T 7/0002; G06T 7/49; G06T 2207/10016; G06T 2207/30168; G06T 15/005; H04N 19/895; H04N 21/44209

See application file for complete search history.

(56) References Cited

U.S. PATENT DOCUMENTS

| | | | |
|---|---|---|---|
| 6,111,582 A | | 8/2000 | Jenkins |
| 2003/0039216 A1* | | 2/2003 | Sheldon .............. H04L 12/1831 370/260 |
| 2019/0037244 A1* | | 1/2019 | Melkote Krishnaprasad .............. H04N 19/105 |

(Continued)

OTHER PUBLICATIONS

International Search Report and Written Opinion—PCT/US2023/032896—ISA/EPO—Jan. 2, 2024.

*Primary Examiner* — Jitesh Patel
(74) *Attorney, Agent, or Firm* — Procopio, Cory, Hargreaves & Savitch/Qualcomm

(57) ABSTRACT

This disclosure provides systems, devices, apparatus, and methods, including computer programs encoded on storage media, for PVS over UDP for split rendering. A graphics processor may obtain, a PVS and a set of video packets. The graphics processor may determine, if a data loss associated with the PVS or the set of video packets is detected, one or more first visible primitives in the set of visible primitives that are currently affected by the data loss associated with the PVS or the set of video packets. The graphics processor may identify concealment information for the one or more first visible primitives in the set of visible primitives based on the one or more first visible primitives in a previous frame. The graphics processor may update information associated with the one or more first visible primitives based on the concealment information for the one or more first visible primitives.

30 Claims, 10 Drawing Sheets

(56) References Cited

U.S. PATENT DOCUMENTS

| | | | |
|---|---|---|---|
| 2019/0236827 A1* | 8/2019 | Hakura | G06T 17/10 |
| 2020/0193690 A1* | 6/2020 | Dokter | G06T 7/50 |
| 2020/0334886 A1* | 10/2020 | Mitchell | A63F 13/358 |
| 2022/0036635 A1* | 2/2022 | Li | G06T 15/20 |
| 2022/0284665 A1 | 9/2022 | Garvey et al. | |

* cited by examiner

PVS OVER UDP FOR SPLIT RENDERING

CROSS REFERENCE TO RELATED APPLICATION(S)

This application claims the benefit of and priority to U.S. Provisional Application Ser. No. 63/377,001, entitled "PVS OVER UDP FOR SPLIT RENDERING" and filed on Sep. 23, 2022, which is expressly incorporated by reference herein in its entirety.

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address delays and packet losses associated with a potentially visible set (PVS) in a split rendering environment. There may be a need for improved delay and packet loss handling techniques.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may obtain a PVS and a set of video packets. The PVS may include PVS information associated with a set of visible primitives that are potentially visible in a first frame. The apparatus may determine, if a data loss associated with the PVS or the set of video packets is detected, one or more first visible primitives in the set of visible primitives that are currently affected by the data loss associated with the PVS or the set of video packets. The apparatus may identify concealment information for the one or more first visible primitives in the set of visible primitives based on the one or more first visible primitives in a previous frame. The apparatus may update information associated with the one or more first visible primitives based on the concealment information for the one or more first visible primitives.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
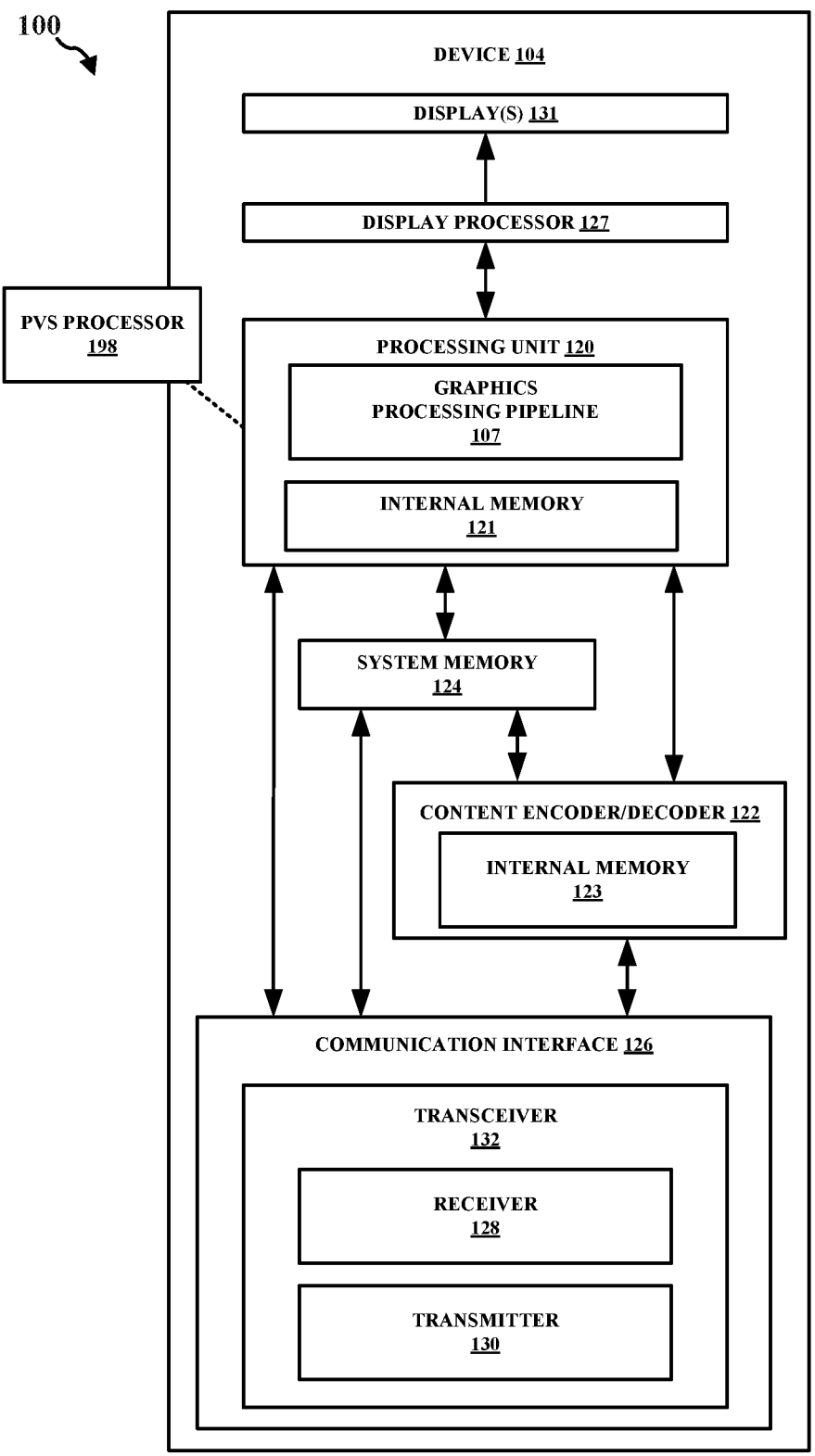
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

When delays and/or packet losses occur in the PVS channel, visual artifacts may result in the image displayed at the client device. For example, if the client device is unable to obtain the correct encoded UV texture coordinates, the surfaces in the displayed image may have incorrect shading. Therefore, there may be a need for techniques for handling delays and/or packet losses in the PVS channel, such that the visual artifacts may be reduced, minimized, and/or eliminated.

According to one or more aspects, a client device may obtain a PVS and a set of video packets. The PVS may include PVS information associated with a set of visible primitives that are potentially visible in a first frame. The client device may determine, if a data loss associated with the PVS or the set of video packets is detected, one or more first visible primitives in the set of visible primitives that are currently affected by the data loss associated with the PVS or the set of video packets. The client device may identify concealment information for the one or more first visible primitives in the set of visible primitives based on one or more second visible primitives. The one or more second visible primitives may correspond to the one or more first visible primitives and may be associated with a frame previous to the first frame. The client device may update information associated with the one or more first visible primitives based on the concealment information for the one or more first visible primitives.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display.

In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content. The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a PVS processor 198 configured to obtain a PVS and a set of video packets. The PVS may include PVS information associated with a set of visible primitives that are potentially visible in a first frame. The PVS processor 198 may be configured to determine, if a data loss associated with the PVS or the set of video packets is detected, one or more first visible primitives in the set of visible primitives that are currently affected by the data loss associated with the PVS or the set of video packets. The PVS processor 198 may be configured to identify concealment information for the one or more first visible primitives in the set of visible primitives based on one or more second visible primitives. The one or more second visible primitives may correspond to the one or more first visible primitives and may be associated with a frame previous to the first frame. The PVS processor 198 may be configured to update information associated with the one or more first visible primitives based on the concealment information for the one or more first visible primitives. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

Figure 2:
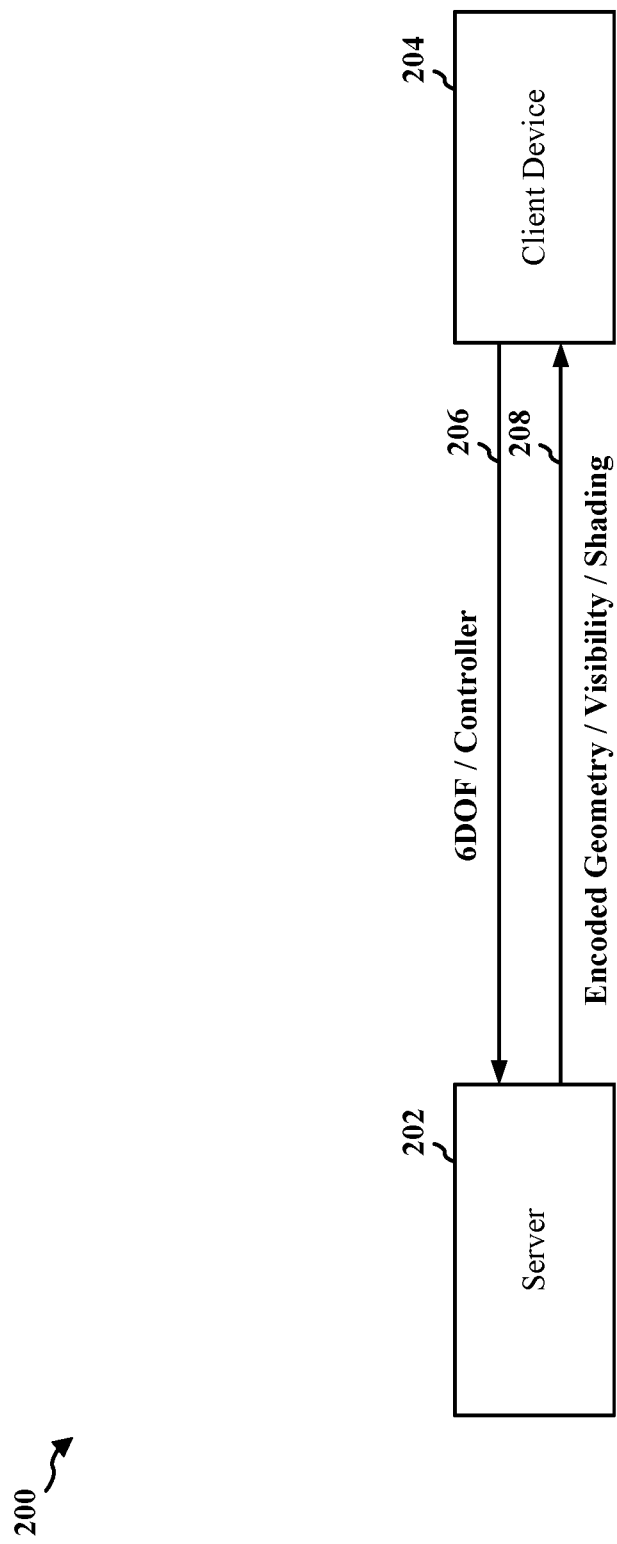
FIG. 2 is a block diagram illustrating an example environment in which aspects of the disclosure may be practiced according to one or more aspects.

FIG. 2 is a block diagram illustrating an example environment 200 in which aspects of the disclosure may be practiced according to one or more aspects. Split rendering (e.g., for an application such as a game, etc.) may be implemented between a client device 204 (e.g., a display, a head-mounted display (HMD), etc.) and a server 202. In general, the client device 204 may receive, in the downlink 208, a rendered image from the server 202. In some configurations, the client device 204 may combine the received image with a locally generated and rendered image to form a single image that is presented to a user. In some further configurations, the server 202 may transmit one or more of encoded geometry information, visibility information, or shading information to the client device 204 in the downlink 208. The client device 204 may receive control input (e.g., via a controller), and then may communicate the control input to the server 202 in the uplink 206 (e.g., subsequent to potential preprocessing). In some configurations, the control input may further include a pose or a predicted pose (e.g., a six degrees of freedom (6DOF) pose) associated the client device 204 (e.g., a (predicted) pose of an HMD).

In split rendering, the server 202 may determine a PVS based on predicted poses associated with the (thin) client device 204. The PVS may include one or more of 1) the surfaces that the client device 204 may render, and 2) encoded UV texture coordinates for sampling a texture atlas (a texture atlas may refer to an image containing different textures for texture mapping) for the surfaces (which may also be referred to as UV mapping information). The server 202 may communicate, in the downlink 208, the PVS to the client device 204 for framerate upsampling. Accordingly, split rendering may decouple shading (e.g., lighting calculations) from rasterization (e.g., conversion of primitives into a raster image). When delays and/or packet losses occur in the PVS channel, visual artifacts may result in the image displayed at the client device 204. For example, if the client device 204 is unable to obtain the correct encoded UV texture coordinates, the surfaces in the displayed image may have wrong shading. Therefore, there may be a need for techniques for handling delays and/or packet losses in the PVS channel, such that the visual artifacts may be reduced, minimized, and/or eliminated.

Vector streaming may be a split rendering architecture for offloading compute-intensive rendering to a cloud server (e.g., the server 202) and streaming the results to a thin client (e.g., the client device 204). On the uplink (e.g., the uplink 206), the client (e.g., the client device 204) may send predicted poses to the server (e.g., the server 202). For every frame, the server (e.g., the server 202) may use the latest predicted poses sent by the client (e.g., the client device 204) to determine/identify the visible triangles (i.e., visible primitives). The server (e.g., the server 202) may shade the visible triangles, and may send to the client (e.g., the client device 204), via the downlink (e.g., the downlink 208) a) a texture atlas (e.g., compressed with standard H.26x) containing the shading (or lighting) of the triangles, and b) the texture coordinates associated with the visible triangles so that the visible triangles may be associated with their respective shading in the texture atlas based on the texture coordinates.

In some configurations, the message that contains the texture coordinates may also indicate the triangles for which the texture coordinates are meant. Therefore, by processing the messages including texture coordinates, the client (e.g., the client device 204) may also learn which triangles may be (potentially) visible and therefore the triangles the client (e.g., the client device 204) may render. The set of potentially visible primitives (e.g., potentially visible triangles) may be referred to hereinafter as the PVS. In some configurations, the client (e.g., the client device 204) may render novel views with the PVS until a new server frame arrives from the server (e.g., the server 202) to the client (e.g., the client device 204).

Embodiments of the disclosure may be used in various environments. One example environment may include a split extended reality (XR) scenario. For example, the XR processing may be split between a computer/edge server and an HMD. Another example environment may include a split augmented reality (AR) scenario. Occlusion rendering may be used in the split AR scenario. Further, having a geometrical representation at the client device may help to hide latency. In particular, when the scene geometry is known to the client, the latency hiding technique (also known as novel view synthesis or generalized reprojection) may produce geometrically exact rendering from the latest viewpoint regardless of the latency in question. Yet another example environment may include a cloud rendering service that may, depending on application specifications, respond (answer) with different latencies. For example, in an automotive/architectural design application, the tolerable latency may be approximately 50-100 ms, whereas in an electronic sports (e-sports) application, the tolerable latency may be approximately 10 ms. Another still example environment may include cloud-connected gaming (e.g., personal computer (PC) gaming or mobile gaming). In particular, the scenes in the games may not be rendered completely locally given the limited physical memory and compute capabilities of the client device (e.g., a mobile device), and the rendered frames may be streamed to the client device as needed in a just-in-time fashion. Features used with cloud-connected gaming may include, e.g., hybrid rendering (locally rendered and remotely rendered (i.e., rendered at the server/cloud) content may be mixed) (which may be used for, e.g., cloud avatar rendering), large geospatial datasets (which may be used for, e.g., a flight simulator), or a virtualized geometry system.

In one or more aspects of the disclosure, the messages including PVS packets (e.g., the messages containing the texture coordinates) may be transmitted over the user datagram protocol (UDP). UDP may be desirable over the transmission control protocol (TCP) because although TCP may be more reliable and may provide in-order delivery of packets, TCP may introduce long delays when there is packet loss, which in the streaming virtual/augmented/extended reality use case may increase the motion-to-render-to-photon (M2R2P) latency, degrading user experience.

If a subset of video packets (e.g., messages containing the texture atlas) for a given frame fails to arrive at the client (e.g., within a specified time period), the client may detect the regions of the frame that are affected by the missing video packets. The client may then conceal the affected regions. In other words, the client device may receive an incomplete frame and may still make progress without stalling the user experience at the client device (assuming the errors are not so drastic as to cause error concealment to operate beyond its limit).

In some configurations, for vector streaming to be real-time in the presence of network errors, PVS packets may behave similarly to video packets: When PVS packets are dropped (i.e., when there are PVS packets missing at the client device), the client device may detect the triangles in the PVS that are affected by the missing PVS packets. The client device may then conceal the errors. Accordingly, the client device may receive an incomplete set of PVS packets without interrupting the user experience at the client device or causing unrecoverable errors. Aspects of the disclosure may relate to the protocol, the error detection, and the error concealment for PVS packets.

Figure 3:
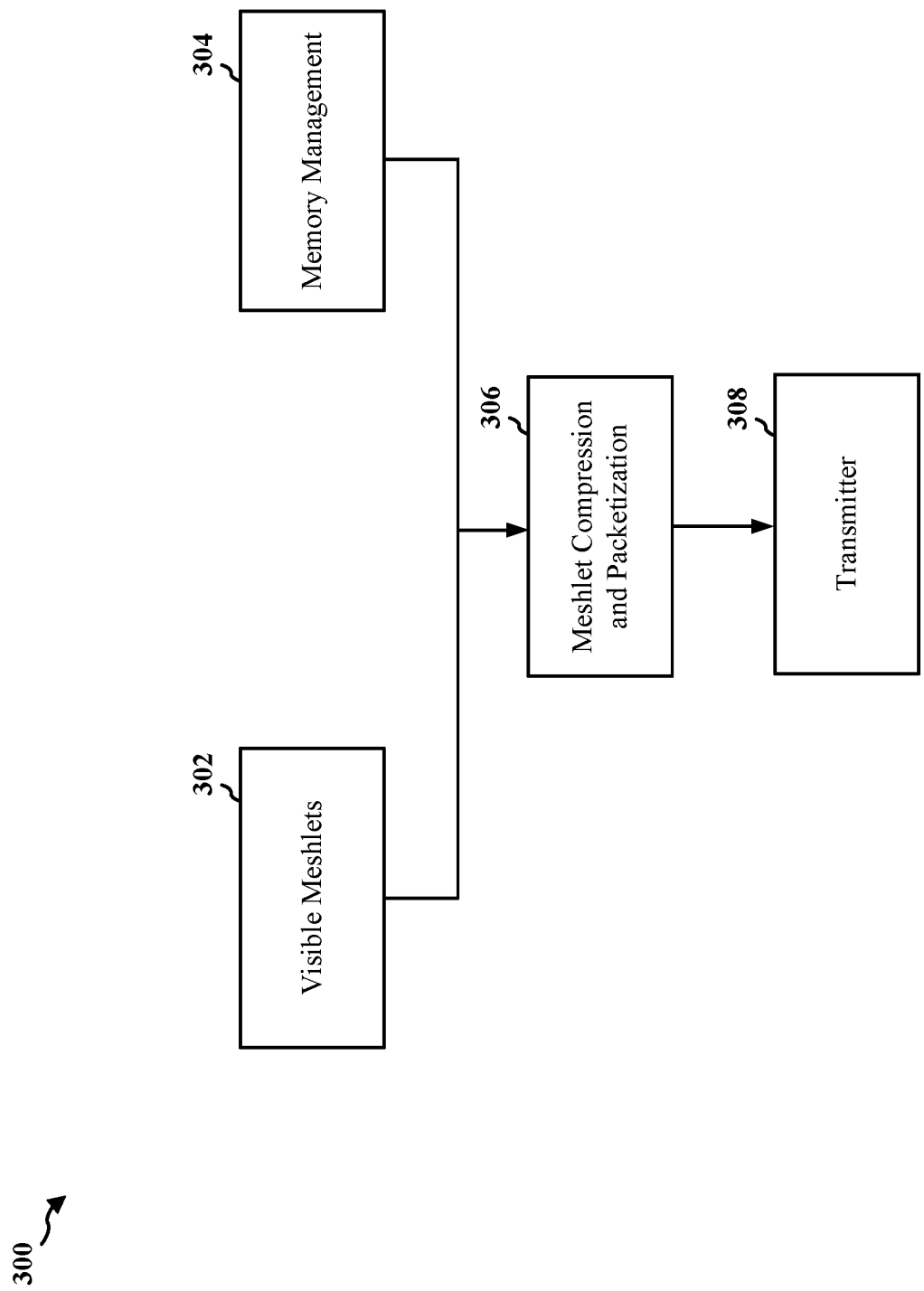
FIG. 3 is a block diagram illustrating example operations at a server in a split rendering application according to one or more aspects.

FIG. 3 is a block diagram 300 illustrating example operations at a server in a split rendering application according to one or more aspects. The operations in FIG. 3 may be performed at, for example, the server 202 of FIG. 2. In some configurations, the PVS may include meshlets. As shown, the server may generate visible meshlets 302. In particular, the server may segment the geometry associated with a frame into meshlets 302. The meshlets 302 may be used because meshlets may be more compressible than other representations and meshlets may be more aligned with graphics processing unit (GPU) driven rendering. In general, if a meshlet is visible, it may be likely that the constituent polygons of the meshlet may also be visible. Further, a meshlet may encode local surface attributes (e.g., visibility, position, texture coordinates (e.g., texcoords, UV texture coordinates), etc.). With the assistance of the memory management block 304, the meshlet compression and packetization block 306 may generate (compressed) meshlet packets, which may be transmitted to the client device via the transmitter 308.

Figure 4:
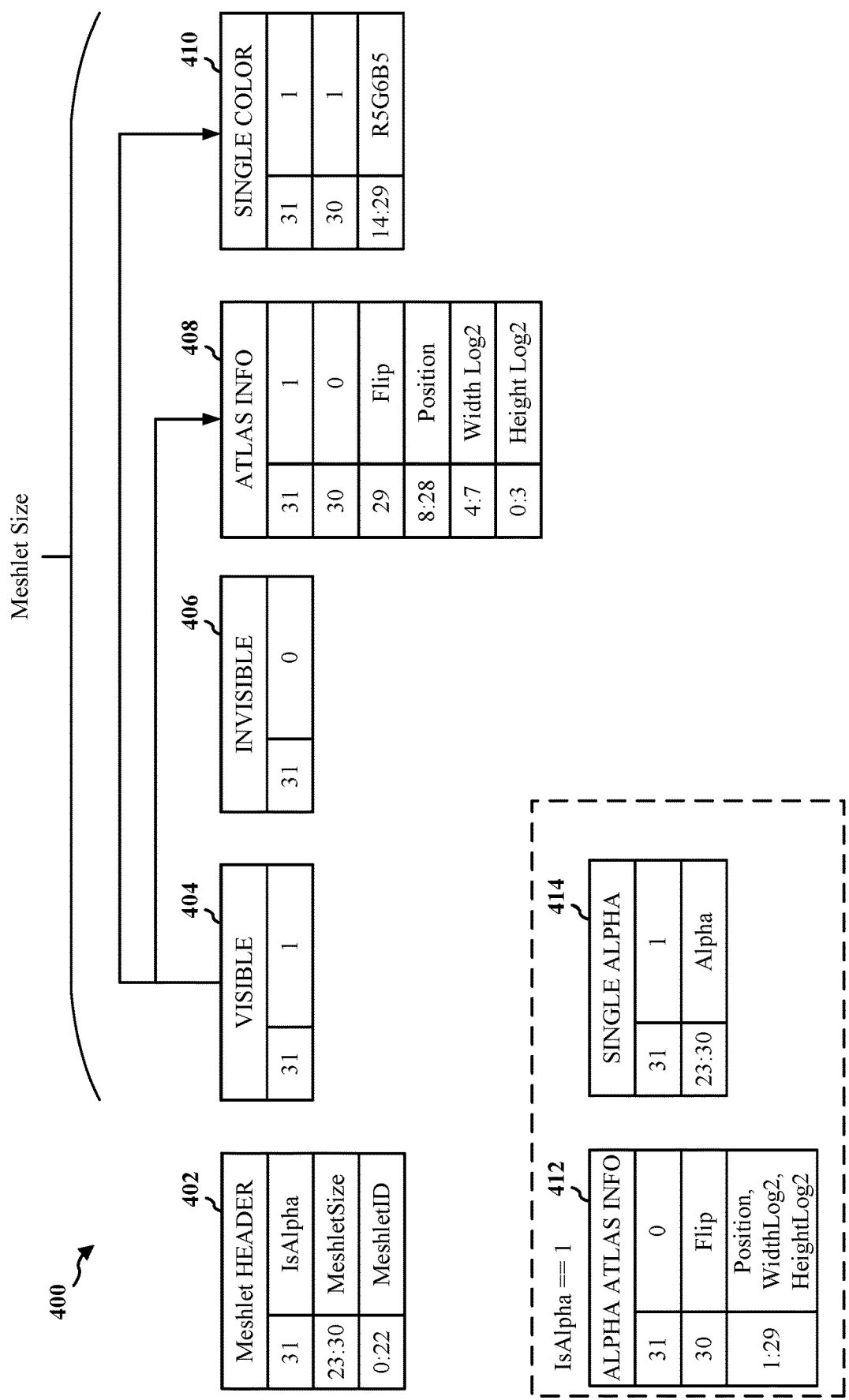
FIG. 4 is a diagram illustrating an example meshlet bitstream according to one or more aspects.

FIG. 4 is a diagram illustrating an example meshlet bitstream 400 according to one or more aspects. The meshlet bitstream 400 may correspond to a datagram, and may represent a meshlet in transit in a communication channel when a server transmits a meshlet to a client device. As shown, the meshlet header portion 402 may include bits that indicate whether the meshlet corresponds to an alpha channel (bit 31: "IsAlpha"), the size of the meshlet (bits 23 to 30: "MeshletSize"), and the identifier (ID) of the meshlet (bits 0 to 22: "MeshletID"). The visible portion 404 may indicate whether the meshlet is visible. The invisible portion 406 may indicate whether the meshlet is invisible. The (texture) atlas information portion 408 may include bits that indicate whether a flip operation is to be performed when the texture is mapped (bit 29: "Flip"), the position in the (texture) atlas (bits 8 to 28: "Position"), the width of the meshlet (bits 4 to 7: "Width Log 2"), and the height of the meshlet (bits 0 to 3: "Height Log 2"). Further, the single color portion 410 may indicate a color (bits 14 to 29: "R5G6B5"). The visible portion 404, the invisible portion 406, the atlas information portion 408, and the single color portion 410 may contribute to the size of the meshlet. In some configurations, the meshlet size may be limited to 128 bits.

If the meshlet corresponds to an alpha channel (i.e., the "IsAlpha" bit is equal to 1), the alpha atlas information portion 412 may include bits that include whether a flip operation is to be performed when the texture is mapped (bit 30: "Flip") and the position in the alpha atlas and the width and the height of the meshlet (bits 1 to 29: "Position," "WidthLog 2," and "HeightLog 2"). Further, the single alpha portion 414 may indicate an alpha value (bits 23 to 30: "Alpha").

In some configurations, the server (e.g., the server 202) may skew the byte statistics to improve compression. In particular, many shading units within a datagram may have a same superblock. Because a same superblock may occur frequently, the same level may also occur frequently. Further, some of the bits in the meshlet bitstream (e.g., the meshlet bitstream 400) may be compressed (e.g., with the zlib library). For example, as shown in FIG. 4, the bits corresponding to the position, the width, and the height in the atlas information portion 408, the bits corresponding to the color in the single color portion 410, the bits corresponding to the position, the width, and the height in the alpha atlas information portion 412, and the bits corresponding to the alpha value in the single alpha portion 414 may be compressed.

In some aspects, because most meshlets may not change levels between frames, heartbeats may be used to reduce the amount of data representative of the meshlets that are transmitted from the server to the client device. If there are no level changes in a meshlet from one frame to another, then the server may send a heartbeat message for that meshlet for the latter frame. Therefore, a heartbeat may be a (small-size) message that may indicate (i) the meshlet in question may still be (potentially) visible, and (ii) the location of the meshlet in question in the atlas may not have changed. In particular, in some configurations, for every frame, the server may message the client device. The message may include the set of (potentially) visible primitives (e.g., triangles) and the texture coordinates for the (potentially) visible primitives (i.e., the PVS). In some configurations, the data layout of the PVS message may be in a compressed form tailored to the vector streaming application. For example, a PVS message may include a set of structures as shown in the following example:

```
struct VisibleTriangleMessage{
    uint32_t triangle_id;
    float texture_coordinates[2];
};
``` where triangle_id may be a globally unique identifier for a triangle in the scene and texture_coordinates may be the location of the triangle in the texture atlas.

Meshlet signaling and triangle signaling may be two different implementations of PVS signaling. In some configurations, meshlets may include triangles. In some configurations, if visible triangles are signaled individually, the corresponding meshlets may not be signaled as well. Aspects described herein in relation to error concealment may be used together with meshlet signaling or triangle signaling. In some configurations, even if triangles are signaled individually, a notion of meshlet may still be used at the server as a unit of visibility, that is, the server may determine which meshlets, and by association which triangles, are potentially visible in each frame. Accordingly, in some instances herein the terms visible/invisible meshlets and visible/invisible triangles may be used interchangeably.

Since most triangles that were in the previous frame may still be visible in the current frame and the location of the triangle likely may not change the texture atlas, the server may encode the temporal redundancy with a heartbeat message. An example heartbeat message may be as follows:

```
struct HeartbeatMessage{
    uint32_t triangle_id;
};
```

The heartbeat message may signal to the client device that the triangle may still be visible and the location of the triangle may not have changed in the texture atlas. The use of the heartbeat message may bring about significant bitrate savings because the information about the location in the texture atlas (i.e., atlas information) may dominate the PVS bitrate. After N (e.g., 10, 15, etc.) consecutive heartbeats are transmitted for a triangle, the server may re-transmit a full message (i.e., Visible TriangleMessage). The retransmission of the full message may represent a tradeoff between the bitrate and the error recovery speed.

Figure 5:
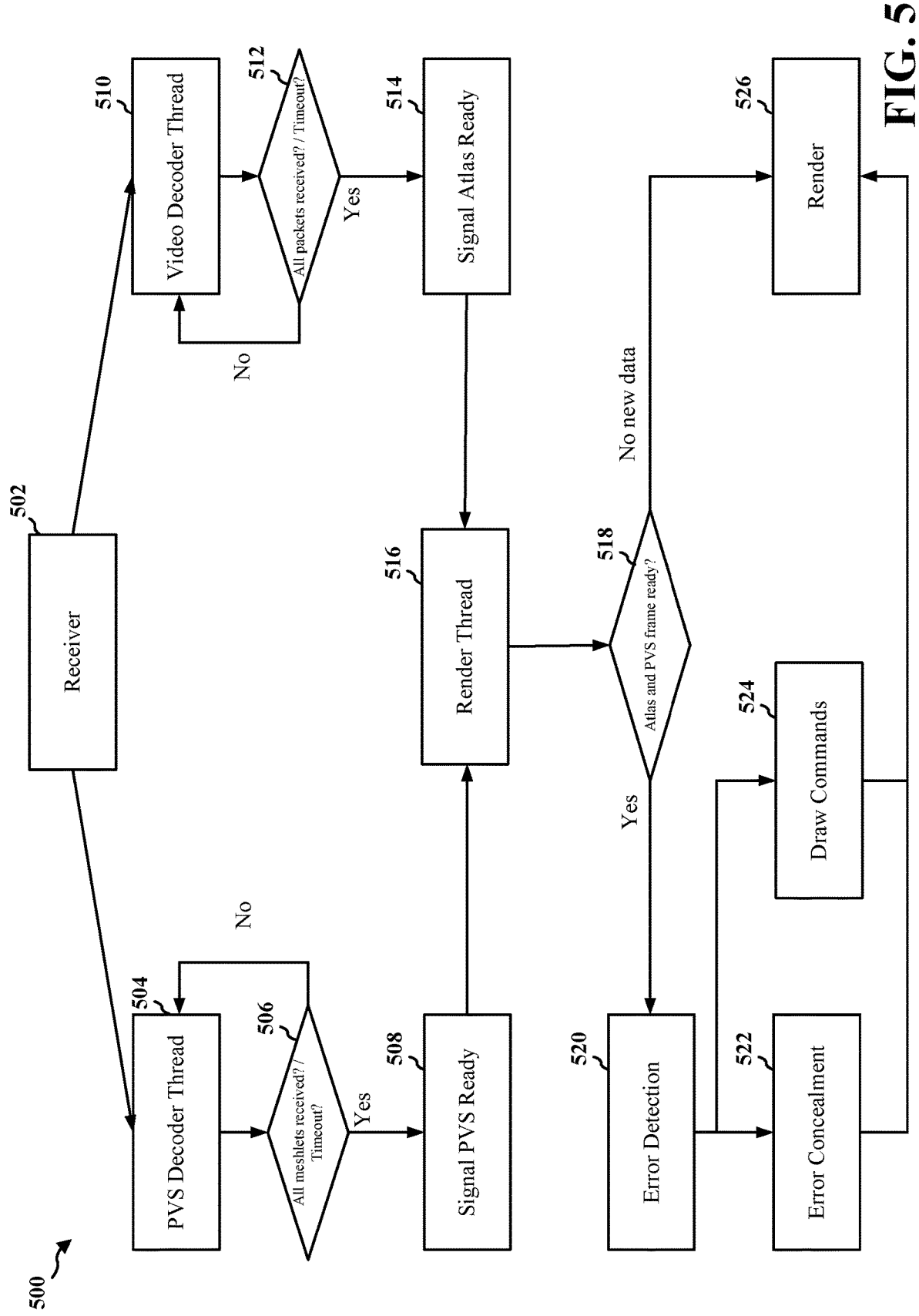
FIG. 5 is a flow diagram illustrating example operations performed at a client device according to one or more aspects.

FIG. 5 is a flow diagram 500 illustrating example operations performed at a client device. For example, the operations in FIG. 5 may be performed at the client device 204. A receiver 502 may receive (compressed) packetized meshlets (meshlet packets) (e.g., from the server 202) and video packets (e.g., corresponding to the (texture) atlas) for a frame. The meshlets may correspond to a PVS. In particular, meshlet messages may constitute or describe the PVS. In other words, meshlet messages may provide (complete) information about the (potentially) visible primitives. The client device may attempt to decode the PVS at the PVS decoder thread 504. In some configurations, the client device may decode the meshlet packets into a GPU-friendly memory representation. At 506, the client device may determine whether all meshlets are received (e.g., based on a "visible meshlet count" in the datagram header). If all meshlets are received or if a timeout (e.g., a "meshlet message timeout") has occurred, at 508, the client device may signal that the PVS is ready for rendering for the frame to the render thread 516. In some configurations, if a packet arrives late (e.g., because a more recent frame is already decoded, or because the packet timed out), the client device may ignore the packet.

In parallel, the client device may attempt to decode the video packets at the video decoder thread 510. At 512, the client device may determine whether all video packets are received. If all video packets are received or if a timeout has occurred, at 514, the client device may signal that the (texture) atlas is ready for rendering for the frame to the render thread 516.

At 518, the render thread 516 may determine whether the (texture) atlas and the PVS are ready for rendering. If they are, the client device may perform error detection operations 520. Two example types of errors may include the dropped meshlet packet error and the dropped video slice error. The error detection operations 520 may be explained in further detail below. Next, the client device may perform error concealment operations 522 and draw commands 524. The error concealment operations 522 may be explained in further detail below. Thereafter, the client device may perform the render operation 526.

In some configurations, if there is no new data for the current frame, the process may proceed directly to the render operation 526 from 518.

In some configurations, meshlet error detection operations may be performed (e.g., at the block for the error detection operations 520 in FIG. 5). For example, a meshlet error may occur when there is a packet loss. If a meshlet was visible in the previous frame and the client device does not receive a message for the meshlet (e.g., a heartbeat message or a message including retransmitted levels for the meshlet) for the current frame, the meshlet may be in error. In another example, if a meshlet was in error for the previous frame and the client device does not receive a message for the meshlet for the current frame, the meshlet may still be in error.

Another type of meshlet error may be associated with heartbeat failures. The heartbeat may be used to reduce the transmission bitrate. However, the heartbeat may introduce complexities to error detection. For example, a heartbeat failure may occur when the client device did not receive a message for a meshlet for the previous frame (i.e., a dropped/missing (PVS) packet) and has received a heartbeat message for the meshlet for the current frame. Because the dropped packet for the previous frame may have included a new level different from the level from even earlier frames, the dropped packet may have invalidated the older level. However, because the packet was dropped, the client device may have no way of knowing the correct level for even the current frame (for which just a heartbeat message is received).

In rare circumstances, there may be an entire frame missing in the transmission from the server to the client device. For example, the client device may encounter a sequence of messages including L (X) H, in that order, where L (X) H may correspond to states of a particular meshlet across three consecutive frames. In particular, L may include a level for a frame, X may indicate that no update is received for the particular meshlet, and H may be a heartbeat message for another frame. The level for the meshlet may have changed in frame X, but based on H, the client device may continue to use the level from frame L for the frame H. As a result, the level used by the client device for frame H may be incorrect.

As another example, a heartbeat failure may occur when a meshlet previously suffered from a heartbeat failure and the client device still has not received a message for a frame that includes a new level for the meshlet.

In other words, in some configurations, when the client device detects missing PVS packets, the client device may detect the triangles in the PVS that are affected by the packet loss. To detect the affected triangles (i.e., the triangles in error), the client device may use a heuristic: If a triangle was visible in the previous frame and the client device has not received a message for the triangle for the current frame, the triangle may be in error. The heuristic may be based on the assumption that triangles that were visible in the previous frame may still be visible in the current frame. The assumption may not always be true: Some triangles that were previously visible may become invisible in the current frame (e.g., as meshlets become visible/invisible, by association all the constituent triangles may correspondingly change their states). However, the client device may not know which triangles may have become invisible in the current frame because the PVS encodes just the visible triangles. Such triangles (i.e., triangles that have become invisible in the current frame but detected by the client device as being in error) may be referred to as "false positive" triangles. In further examples, triangles may also be in error when texture coordinates of the triangles correspond to (overlap) missing regions of an incomplete video frame (e.g., due to missing video packets).

Figure 6:
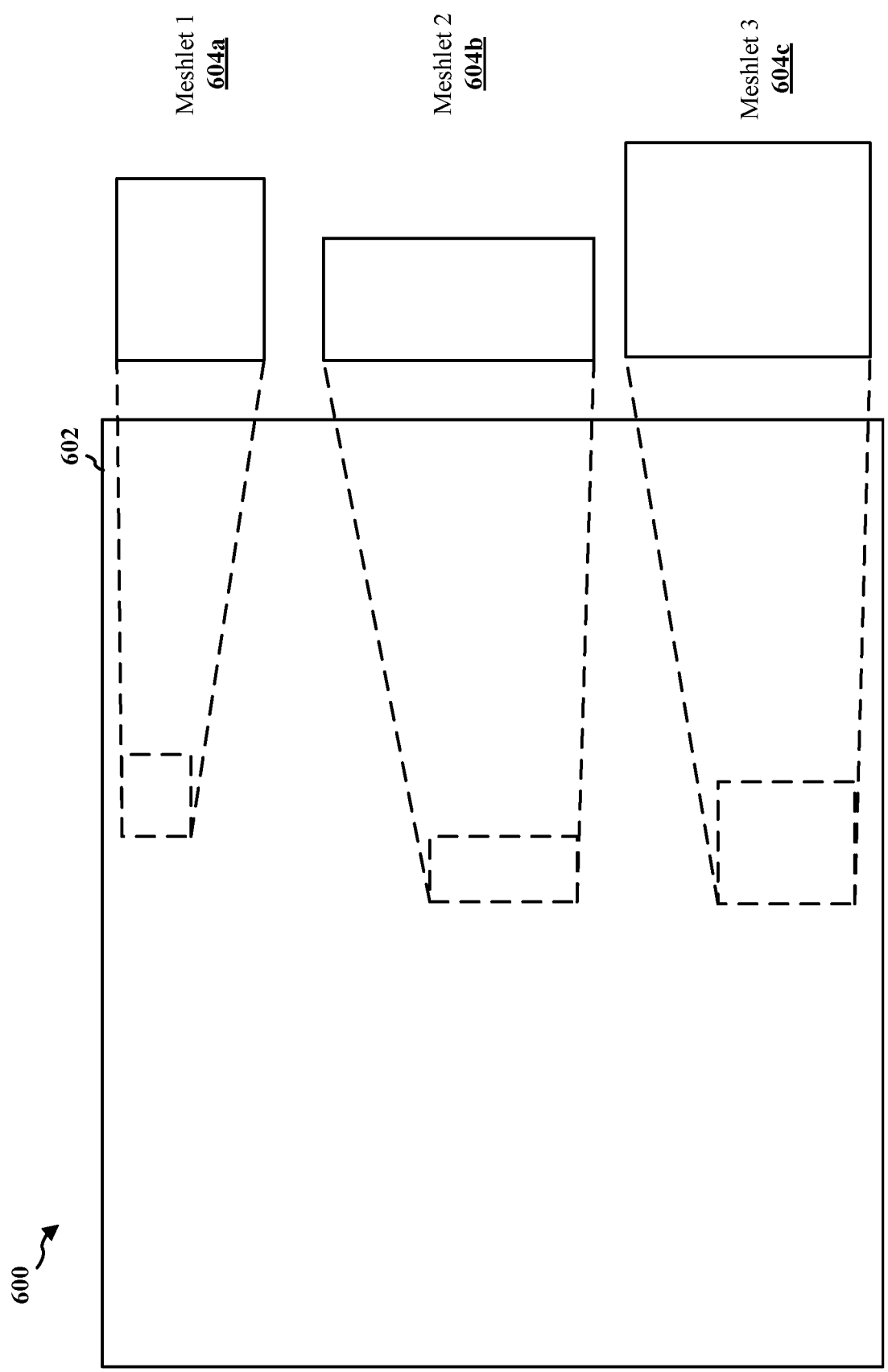
FIG. 6 is a diagram illustrating example meshlets according to one or more aspects.

FIG. 6 is a diagram 600 illustrating example meshlets according to one or more aspects. As shown, a frame 602 of a scene may include a first meshlet 604a, a second meshlet 604b, and a third meshlet 604c.

Figure 7:
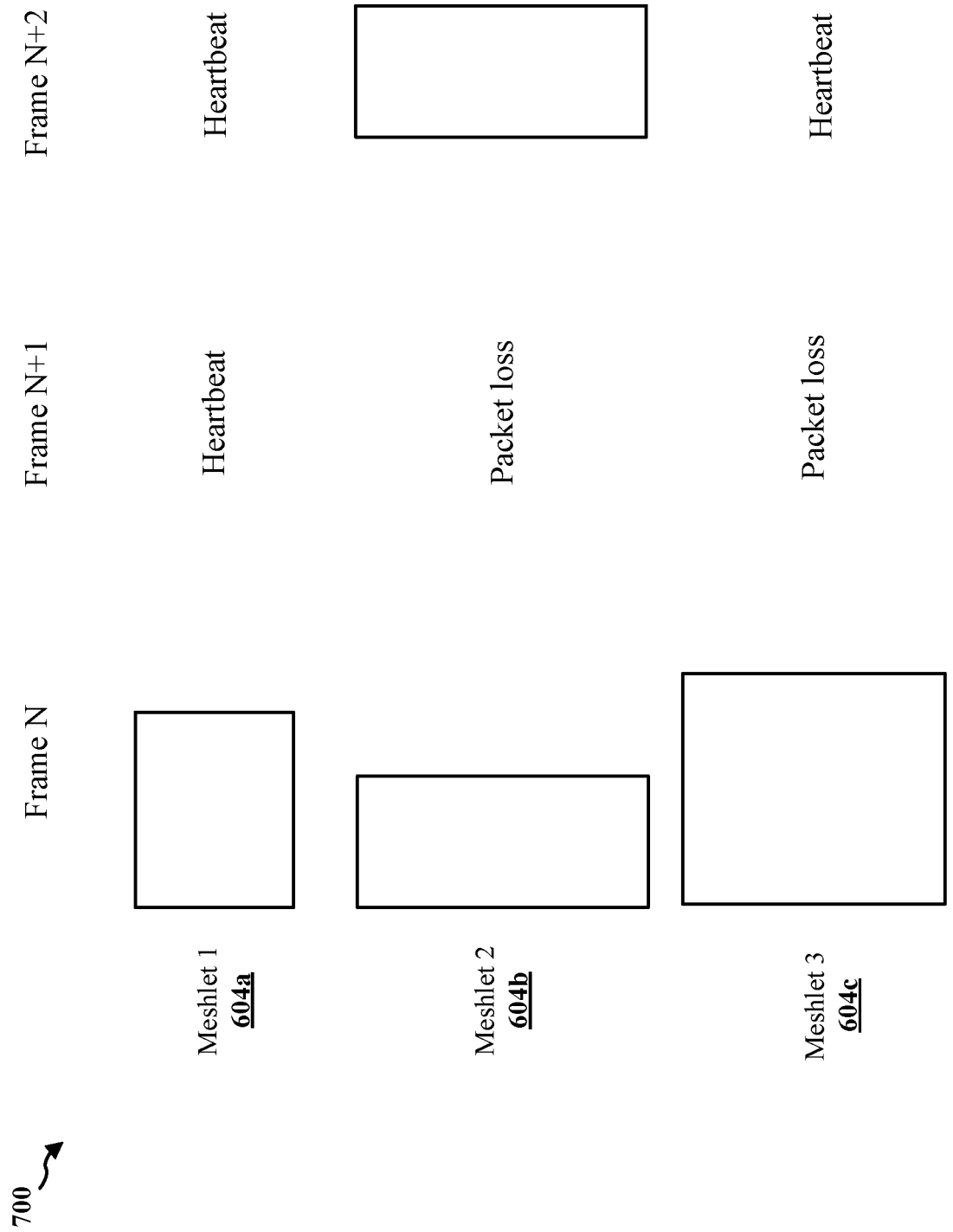
FIG. 7 is a diagram illustrating example meshlet errors according to one or more aspects.

FIG. 7 is a diagram 700 illustrating example meshlet errors according to one or more aspects. As shown, the client device may receive messages indicating the first meshlet 604a, the second meshlet 604b, and the third meshlet 604c for the frame N. For the frame N, the client device may receive level updates for all three meshlets (e.g., as new or different locations in the atlas are allocated to describe the corresponding primitives). The client device may add the three meshlets to the meshlet visibility buffer.

For the frame N+1 (i.e., the frame immediately subsequent to the frame N), the client device may receive a heartbeat message for the first meshlet 604a. Accordingly, the client device may reuse the level for the first meshlet 604a from the frame N for the frame N+1.

The second meshlet 604b and the third meshlet 604c were visible in the frame N. However, the client device may not receive a message for either second meshlet 604b or the third meshlet 604c for the frame N+1 (i.e., dropped packet). Accordingly, the client device may notice the packet loss. As a result, for the frame N+1, the second meshlet 604b and the third meshlet 604c may be in error.

For the frame N+2 (i.e., the frame immediately subsequent to the frame N+1), the client device may receive a heartbeat message for the first meshlet 604a. Accordingly, the client device may reuse the level for the first meshlet 604a from the frame N (and the frame N+1) for the frame N+2.

Further, the client device may receive a message including a level for the second meshlet 604b for the frame N+2. Accordingly, the second meshlet 604b may no longer be in error for the frame N+2.

However, the third meshlet 604c may still be in error for the frame N+2 because while the client device has received a heartbeat message for the third meshlet 604c for the frame N+2, the dropped packet for the third meshlet 604c for the frame N+1 may have included a level change. In other words, because the packet for the third meshlet 604c for the frame N+1 was lost, the client device may not know the correct level for the third meshlet 604c for the frame N+2. As a result, the third meshlet 604c may still be in error for the frame N+2.

In some configurations, the client device may perform error concealment operations (e.g., at the block for the error concealment operations 522 in FIG. 5). In one configuration, to perform error concealment, the client device may use the screen space cache (e.g., a reprojection). However, geometric error may persist due to disocclusions even though correct depth and motion vectors may be available. In another configuration, to perform error concealment, the client device may use the texture space cache. In particular, the client device may look up the shading of the previous frame using the texture coordinates associated with the previous frame. The client device may then reuse the shading for the current frame. This technique may be geometrically exact. In further configurations, the client device may use the texture space cache to conceal errors when vector streaming is used.

In other words, in some configurations, after error detection, the client device may have two sets of visible triangles for the current frame, i.e., triangles that are in error and triangles that are not in error.

In some configurations, when the set of visible triangles are drawn to the screen, the error concealment technique may use any of the following mechanisms to determine the final pixel color for a triangle in error: a) texture space cache, b) screen space cache, and c) inpainting. In particular, for a triangle in error, the client device may first perform a cache lookup into the texture space cache, which may include the last successfully received texture values for the triangle. If there is a cache hit, the client device may use the texture values stored in the texture space cache for the triangle. If a texture space cache miss occurs, the client device may fall back to the screen space cache, which may use temporal reprojection to sample where the triangle would have been (in screen-space) in the previous frame. If a screen space cache miss occurs (e.g., due to the triangle being off-screen or a depth discontinuity), the client device may use inpainting to render the current pixel of the current triangle.

In some configurations, when all PVS packets are properly received, the client device may mark the "false-positive" triangles invisible by checking whether they correspond to the triangles in the set of VisibleTriangleMessage's for the current frame. If a triangle is not in the set, then the client device may mark the "false-positive" triangle invisible.

In some configurations, the texture cache may include 5 channels: RGBA and an additional ReprojectionMask channel. The ReprojectionMask channel may be a binary value indicating whether the cache contains valid texture values at that texel.

In some configurations, the client device may allocate a texture ID from a list of available texture IDs for a triangle that just became in error in the current frame, where the available texture IDs may correspond to locations in the texture cache. The client device may then look up the texture values for these triangles from the decoded texture atlas for the previous frame and, if the texture values are found, the client device may store the texture values at the location specified by the texture ID in the RGBA channels of the texture cache, and may set the ReprojectionMask to 0. If the client device cannot locate valid texture values for the triangles from the previous frame (which may occur when, e.g., a triangle just became visible in the current frame, but the texture content of the triangle corresponds to (overlaps) a missing region of the video frame), then the client device may set the ReprojectionMask to 1, indicating that any pixel in the rasterized triangle that samples this part of the texture cache may not use the contents of the texture cache; instead, a fallback to the screen space cache may be used.

In some configurations, the client device may deallocate a texture ID for a triangle, returning the texture ID to the list of available texture IDs, when the triangle i) becomes invisible, or ii) is no longer in error.

Figure 8:
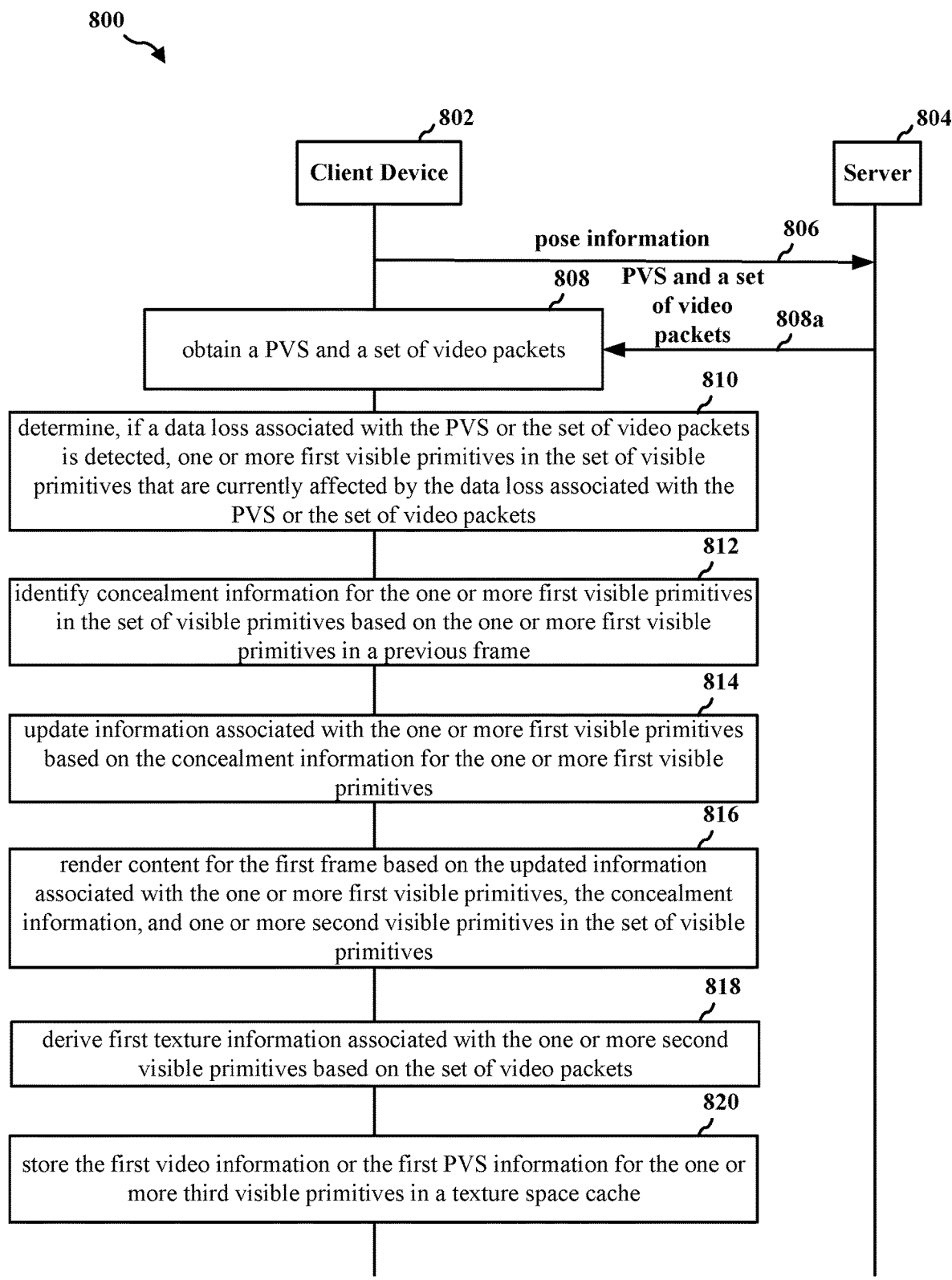
FIG. 8 is a call flow diagram illustrating example communications between a client device and a server in accordance with one or more techniques of this disclosure.

FIG. 8 is a call flow diagram 800 illustrating example communications between a client device 802 and a server 804 in accordance with one or more techniques of this disclosure. The client device 802 may correspond to the client device 204. Further, the server 804 may correspond to the server 202. At 806, the client device 802 may transmit pose information associated with the client device 802 to the server 804.

At 808, the client device 802 may obtain a PVS and a set of video packets. The PVS may include PVS information associated with a set of visible primitives that are potentially visible in a first frame. Herein a primitive may refer to a geometric primitive, i.e., a basic unit of graphics information for the purpose of rendering. For example, a triangle or a meshlet may be a primitive. Further, the PVS may refer to the information describing the mapping of primitives to the locations (places) in the texture atlas (texture space cache) where the current shading of the primitives is described. Moreover, the PVS may also implicitly encode visibility of primitives. In other words, a primitive may be considered visible if it is first indicated (mentioned) in the PVS stream. As such, based on the received PVS and the video packets, the client device 802 may derive the shaded textures for the corresponding primitives.

The PVS may be based on a predicted pose of the pose information associated with the client device 802 (the pose prediction may be performed at the server 804 or the client device 802). In particular, at 808a, the client device 802 may receive the PVS and the set of video packets from the server 804.

In one configuration, the PVS and the set of video packets may be received from the server 804 via one or more UDP packets.

In one configuration, the set of visible primitives may correspond to a set of meshlets. Each meshlet of the set of meshlets may include at least one visible primitive of the set of visible primitives.

In one configuration, each first visible primitive in the one or more first visible primitives may be affected by at least one of a video packet error, a meshlet visibility error, a meshlet atlas information error, or a meshlet level change error.

In one configuration, the meshlet visibility error or the meshlet level change error may be associated with a heartbeat failure.

In one configuration, the PVS may further include UV mapping information.

At 810, the client device 802 may determine, if a data loss associated with the PVS or the set of video packets is detected, one or more first visible primitives in the set of visible primitives that are currently affected by the data loss associated with the PVS or the set of video packets.

In one configuration, the data loss associated with the PVS or the set of video packets may correspond to obtaining less than all video packets of the set of video packets or less than all PVS data packets (all the PVS information) associated with all of the set of visible primitives. For example, video packets and/or PVS data packets associated with the one or more first visible primitives may not be successfully received and/or decoded by the client device 802.

In one configuration, the data loss associated with the PVS or the set of video packets may be detected by the client device 802 within a first time period (e.g., within a timeout period).

For example, every primitive that was visible (e.g., signaled) in the previous server frame may be signaled/updated in the current frame as well. If the client device 802 detects that a primitive did not receive an update where an update was expected, the client device 802 may infer that the corresponding PVS packet is missing. In a further example, a video decoder at the client device 802 may detect video packet drops (e.g., real-time transport protocol (RTP) packet drops) based on inconsistencies in the moving picture experts group (MPEG) video stream.

At 812, the client device 802 may identify concealment information for the one or more first visible primitives in the set of visible primitives based on the one or more first visible primitives in a previous frame.

In some configurations, the one or more first visible primitives in the previous frame may not be affected by any previous data loss. The one or more first visible primitives in the previous frame may be associated with one or more textures used in the first frame.

In some configurations, the concealment information may be associated with a derivation of concealment textures that represent the one or more first visible primitives in the first frame.

In some configurations, if the corresponding visible primitives associated with a previous frame is not available (e.g., primitives not visible in previous frames but are now visible in the current frame and are affected by the data loss; or primitives always affected by data loss and as a result the corresponding concealment information may not be derived) (e.g., a miss on the texture space cache), the concealment information may be determined/identified based on inpainting (or a screen space cache lookup).

At 814, the client device 802 may update information associated with the one or more first visible primitives based on the concealment information for the one or more first visible primitives.

At 816, the client device 802 may render content for the first frame based on the updated information (e.g., using concealment textures identified based on the concealment information in place of the missing textures) associated with the one or more first visible primitives, the concealment information, and/or one or more second visible primitives in the set of visible primitives. The one or more second visible primitives may not currently be affected by the data loss. In other words, the data packets and the PVS information associated with the one or more second visible primitives may be currently available.

In one configuration, the video information for the one or more second visible primitives may be associated with a texture space cache (e.g., a texture atlas) or inpainting.

At 818, the client device 802 may derive first texture information associated with the one or more second visible primitives based on the set of video packets. An association between the first texture information and the one or more second visible primitives may be based on a derivation of the PVS information (e.g., associated with the one or more second visible primitives).

At 820, the client device 802 may store the first texture information associated with the one or more second visible primitives in the texture space cache.

Figure 9:
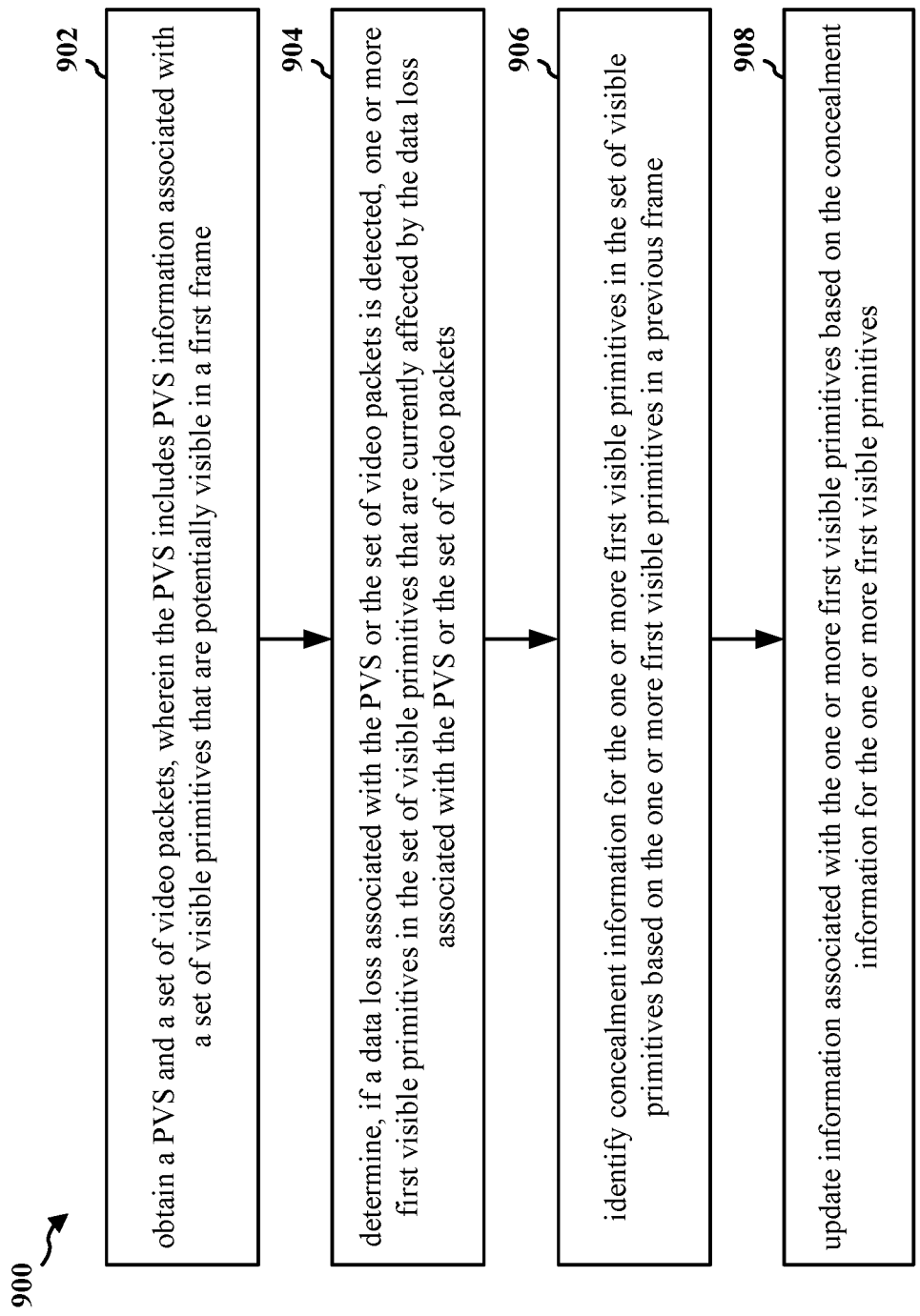
FIG. 9 is a flowchart of an example method of graphics processing in accordance with one or more techniques of this disclosure.

FIG. 9 is a flowchart 900 of an example method of graphics processing in accordance with one or more techniques of this disclosure. The method may be performed by a first device, such as an apparatus for graphics processing, a GPU, a CPU, a wireless communication device, and the like, as used in connection with the aspects of FIGS. 1-8.

At 902, the first device may obtain a PVS and a set of video packets. The PVS may include PVS information associated with a set of visible primitives that are potentially visible in a first frame. For example, referring to FIG. 8, at 808, the first device (e.g., the client device 802) may obtain a PVS and a set of video packets. 902 may also be performed by the processing unit 120 in FIG. 1.

At 904, the first device may determine, if a data loss associated with the PVS or the set of video packets is detected, one or more first visible primitives in the set of visible primitives that are currently affected by the data loss associated with the PVS or the set of video packets. For example, referring to FIG. 8, at 810, the first device (e.g., the client device 802) may determine, if a data loss associated with the PVS or the set of video packets is detected, one or more first visible primitives in the set of visible primitives that are currently affected by the data loss associated with the PVS or the set of video packets. 904 may also be performed by the processing unit 120 in FIG. 1.

At 906, the first device may identify concealment information for the one or more first visible primitives in the set of visible primitives based on the one or more first visible primitives in a previous frame. For example, referring to FIG. 8, at 812, the first device (e.g., the client device 802) may identify concealment information for the one or more first visible primitives in the set of visible primitives based on the one or more first visible primitives in a previous frame. 906 may also be performed by the processing unit 120 in FIG. 1.

At 908, the first device may update information associated with the one or more first visible primitives based on the concealment information for the one or more first visible primitives. For example, referring to FIG. 8, at 814, the first device (e.g., the client device 802) may update information associated with the one or more first visible primitives based on the concealment information for the one or more first visible primitives. 908 may also be performed by the processing unit 120 in FIG. 1.

Figure 10:
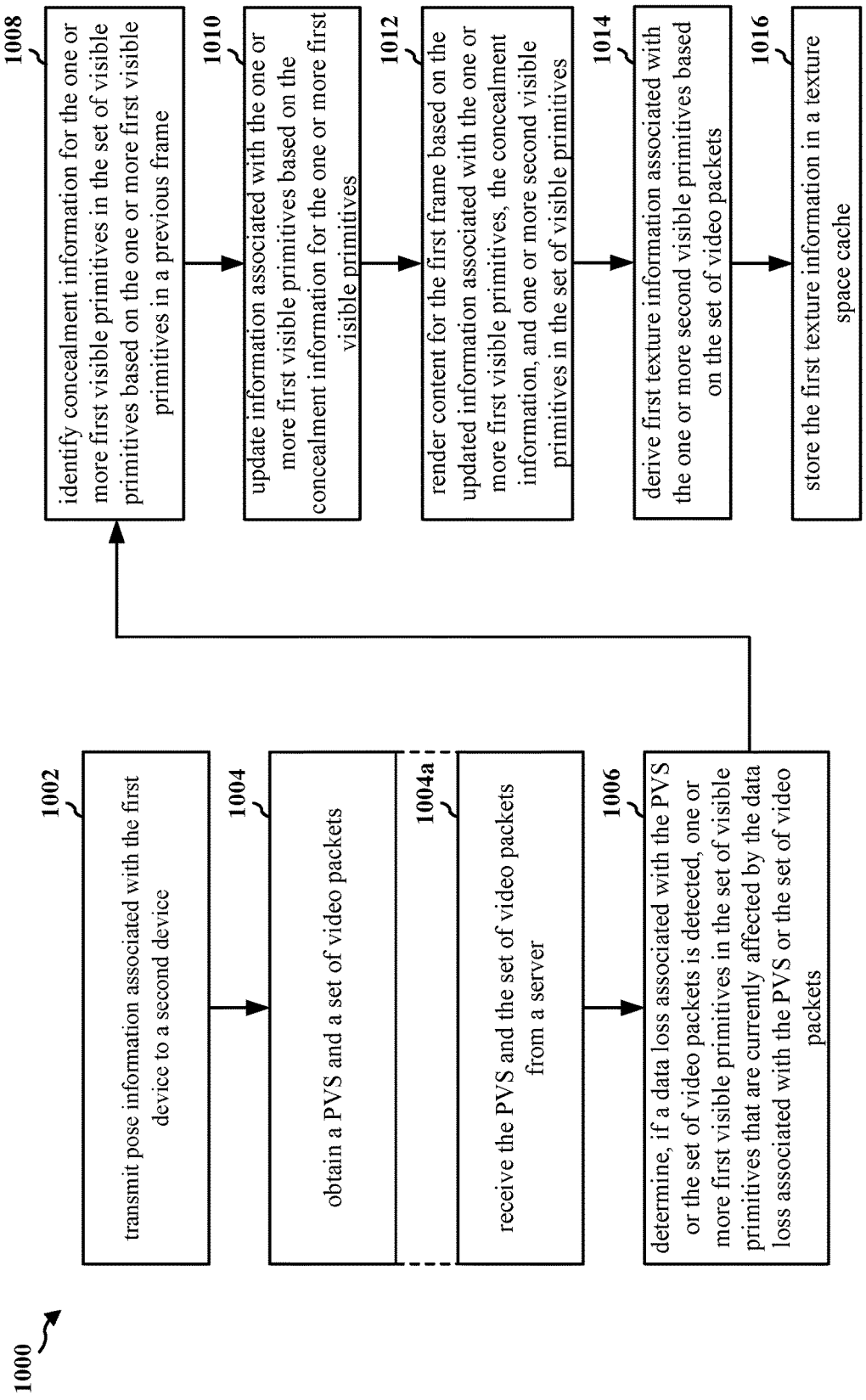
FIG. 10 is a flowchart of an example method of graphics processing in accordance with one or more techniques of this disclosure.

FIG. 10 is a flowchart 1000 of an example method of graphics processing in accordance with one or more techniques of this disclosure. The method may be performed by a first device, such as an apparatus for graphics processing, a GPU, a CPU, a wireless communication device, and the like, as used in connection with the aspects of FIGS. 1-8.

At 1004, the first device may obtain a PVS and a set of video packets. The PVS may include PVS information associated with a set of visible primitives that are potentially visible in a first frame. For example, referring to FIG. 8, at 808, the first device (e.g., the client device 802) may obtain a PVS and a set of video packets. 1004 may also be performed by the processing unit 120 in FIG. 1.

At 1006, the first device may determine, if a data loss associated with the PVS or the set of video packets is detected, one or more first visible primitives in the set of visible primitives that are currently affected by the data loss associated with the PVS or the set of video packets. For example, referring to FIG. 8, at 810, the first device (e.g., the client device 802) may determine, if a data loss associated with the PVS or the set of video packets is detected, one or more first visible primitives in the set of visible primitives that are currently affected by the data loss associated with the PVS or the set of video packets. 1006 may also be performed by the processing unit 120 in FIG. 1.

At 1008, the first device may identify concealment information for the one or more first visible primitives in the set of visible primitives based on the one or more first visible primitives in a previous frame. For example, referring to FIG. 8, at 812, the first device (e.g., the client device 802) may identify concealment information for the one or more first visible primitives in the set of visible primitives based on the one or more first visible primitives in a previous frame. 1008 may also be performed by the processing unit 120 in FIG. 1.

At 1010, the first device may update information associated with the one or more first visible primitives based on the concealment information for the one or more first visible primitives. For example, referring to FIG. 8, at 814, the first device (e.g., the client device 802) may update information associated with the one or more first visible primitives based on the concealment information for the one or more first visible primitives. 1010 may also be performed by the processing unit 120 in FIG. 1.

In one configuration, one or more second visible primitives in the set of visible primitives may not currently be affected by the data loss. The one or more second visible primitives may be associated with one or more textures used in the first frame. The one or more textures may be based on the set of video packets. An association between the one or more textures and the one or more second visible primitives may be based on a derivation of the PVS information.

In one configuration, the concealment information may be associated with a derivation of concealment textures that may represent the one or more first visible primitives in the first frame. In particular, concealment textures may store atlas space renditions of meshlets affected by data loss. Accordingly, concealment textures may be used during client rendering in lieu of the missing up-to-date meshlet representations.

In one configuration, at 1012, the first device may render content for the first frame based on the updated information associated with the one or more first visible primitives, the concealment information, and one or more second visible primitives in the set of visible primitives. The one or more second visible primitives may not be currently affected by the data loss. For example, referring to FIG. 8, at 816, the first device (e.g., the client device 802) may render content for the first frame based on the updated information associated with the one or more first visible primitives, the concealment information, and one or more second visible primitives in the set of visible primitives. 1012 may also be performed by the processing unit 120 in FIG. 1.

In one configuration, the data loss associated with the PVS or the set of video packets may correspond to a reception of less than all video packets of the set of video packets or less than all PVS data packets of a set of PVS data packets associated with the one or more first visible primitives.

In one configuration, at 1014, the first device may derive first texture information associated with the one or more second visible primitives based on the set of video packets. An association between the first texture information and the one or more second visible primitives may be based on a derivation of the PVS information. For example, referring to FIG. 8, at 818, the first device (e.g., the client device 802) may derive first texture information associated with the one or more second visible primitives based on the set of video packets. 1014 may also be performed by the processing unit 120 in FIG. 1.

At 1016, the first device may store the first texture information in a texture space cache. For example, referring to FIG. 8, at 820, the first device (e.g., the client device 802) may store the first texture information in a texture space cache. 1016 may also be performed by the processing unit 120 in FIG. 1.

In one configuration, at least one concealment texture may be associated with a texture cache lookup if there is a hit on the texture space cache. In particular, the texture space cache may contain the last successfully received texture values for each geometric primitive (e.g., a meshlet or a triangle). If a given primitive (specifically its texture information) was never before received correctly, then the cache for this primitive may be empty, and the corresponding lookup may result in a cache miss. Otherwise, a reference texture may be retrieved from the texture space cache based on an index of the primitive. The at least one concealment texture may be associated with a screen space cache lookup or an inpainting process if there is a miss on the texture space cache.

In one configuration, to obtain, at 1004, the PVS and the set of video packets, at 1004*a*, the first device may receive the PVS and the set of video packets from a server. For example, referring to FIG. 8, at 808*a*, the first device (e.g., the client device 802) may receive the PVS and the set of video packets from a server 804. 1004*a* may also be performed by the processing unit 120 in FIG. 1.

In one configuration, referring to FIG. 8, the PVS and the set of video packets may be received, at 808*a*, from the server 804 via one or more UDP packets.

In one configuration, the set of visible primitives may correspond to a set of meshlets. Each meshlet of the set of meshlets may include at least one visible primitive of the set of visible primitives.

In one configuration, each first visible primitive in the one or more first visible primitives may be affected by at least one of a video packet error, a meshlet visibility error, a meshlet atlas information error, or a meshlet level change error.

In one configuration, the meshlet visibility error or the meshlet level change error may be associated with a heartbeat failure.

In one configuration, at 1002, the first device may transmit pose information associated with the first device to a second device. The PVS may be based on a predicted pose of the pose information associated with the first device. For example, referring to FIG. 8, at 806, the first device (e.g., the client device 802) may transmit pose information associated with the first device (e.g., the client device 802) to a second device (e.g., the server 804). 1002 may also be performed by the processing unit 120 in FIG. 1.

In one configuration, the data loss associated with the PVS or the set of video packets may be associated with an expiry of a first time period.

In one configuration, the one or more first visible primitives in the previous frame may not be affected by any previous data loss.

In one configuration, the PVS may further include UV mapping information.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for obtaining a PVS and a set of video packets. The PVS may include PVS information associated with a set of visible primitives that are potentially visible in a first frame. The apparatus may include means for determining, if a data loss associated with the PVS or the set of video packets is detected, one or more first visible primitives in the set of visible primitives that are currently affected by the data loss associated with the PVS or the set of video packets. The apparatus may include means for identifying concealment information for the one or more first visible primitives in the set of visible primitives based on based on the one or more first visible primitives in a previous frame. The apparatus may include means for updating information associated with the one or more first visible primitives based on the concealment information for the one or more first visible primitives.

In one configuration, the means for updating information associated with the one or more first visible primitives based on the concealment information for the one or more first visible primitives may be further configured to conceal the one or more first visible primitives based on the concealment information. In one configuration, the concealment information may be associated with a derivation of concealment textures that represent the one or more first visible primitives in the first frame. The apparatus may include means for rendering content for the first frame based on the updated information associated with the one or more first visible primitives, the concealment information, and one or more second visible primitives in the set of visible primitives. The one or more second visible primitives may not currently be affected by the data loss. In one configuration, the data loss associated with the PVS or the set of video packets may correspond to obtaining less than all video packets of the set of video packets or less than all PVS data packets of a set of PVS data packets associated with the one or more first visible primitives. In one configuration, the apparatus may include means for deriving first texture information associated with the one or more second visible primitives based on the set of video packets. An association between the first texture information and the one or more second visible primitives may be based on a derivation of the PVS information. The apparatus may include means for storing the first texture information in a texture space cache. In one configuration, at least one concealment texture may be associated with a texture cache lookup if there is a hit on the texture space cache. The at least one concealment texture may be associated with a screen space cache lookup or an inpainting process if there is a miss on the texture space cache. In one configuration, the means for obtaining the PVS and the set of video packets may be further configured to receive the PVS and the set of video packets from a server. In one configuration, the PVS and the set of video packets may be received from the server via one or more UDP packets. In one configuration, the set of visible primitives may correspond to a set of meshlets. Each meshlet of the set of meshlets may include at least one visible primitive of the set of visible primitives. In one configuration, each first visible primitive in the one or more first visible primitives may be affected by at least one of a video packet error, a meshlet visibility error, a meshlet atlas information error, or a meshlet level change error. In one configuration, the meshlet visibility error or the meshlet level change error may be associated with a heartbeat failure. In one configuration, the apparatus may include means for transmitting pose information associated with the first device to a second device. The PVS may be based on a predicted pose of the pose information associated with the first device. The first device may be a client device. The second device may be a server. In one configuration, the data loss associated with the PVS or the set of video packets may be detected within a first time period. In one configuration, the one or more first visible primitives in the previous frame may not be affected by any previous data loss. In one configuration, the PVS may further include UV mapping information.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration."

Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing at a first device, including: obtaining, a PVS and a set of video packets, where the PVS includes PVS information associated with a set of visible primitives that are potentially visible in a first frame; determining, if a data loss associated with the PVS or the set of video packets is detected, one or more first visible primitives in the set of visible primitives that are currently affected by the data loss associated with the PVS or the set of video packets; identifying concealment information for the one or more first visible primitives in the set of visible primitives based on the one or more first visible primitives in a previous frame; and updating information associated with the one or more first visible primitives based on the concealment information for the one or more first visible primitives.

Aspect 2 may be combined with aspect 1 and includes that one or more second visible primitives in the set of visible primitives are not currently affected by the data loss, the one or more second visible primitives are associated with one or more textures used in the first frame, the one or more textures are based on the set of video packets, and an association between the one or more textures and the one or more second visible primitives is based on a derivation of the PVS information.

Aspect 3 may be combined with any of aspects 1-2 and includes that the concealment information is associated with a derivation of concealment textures that represent the one or more first visible primitives in the first frame.

Aspect 4 may be combined with any of aspects 1-3 and further includes: rendering content for the first frame based on the updated information associated with the one or more first visible primitives, the concealment information, and one or more second visible primitives in the set of visible primitives, where the one or more second visible primitives are not currently affected by the data loss.

Aspect 5 may be combined with aspect 4 and includes that the data loss associated with the PVS or the set of video packets corresponds to a reception of less than all video packets of the set of video packets or less than all PVS data packets of a set of PVS data packets associated with the one or more first visible primitives.

Aspect 6 may be combined with any of aspects 4-5 and further includes: derive first texture information associated with the one or more second visible primitives based on the set of video packets, an association between the first texture information and the one or more second visible primitives being based on a derivation of the PVS information; and storing the first texture information in a texture space cache.

Aspect 7 may be combined with aspect 6 and includes that at least one concealment texture is associated with a texture cache lookup if there is a hit on the texture space cache, and where the at least one concealment texture is associated with a screen space cache lookup or an inpainting process if there is a miss on the texture space cache.

Aspect 8 may be combined with any of aspects 1-7 and includes that the obtaining the PVS and the set of video packets further includes: receiving the PVS and the set of video packets from a server.

Aspect 9 may be combined with aspect 8 and includes that the PVS and the set of video packets are received from the server via one or more UDP packets.

Aspect 10 may be combined with any of aspects 1-9 and includes that the set of visible primitives corresponds to a set of meshlets, and each meshlet of the set of meshlets includes at least one visible primitive of the set of visible primitives.

Aspect 11 may be combined with aspect 10 and includes that each first visible primitive in the one or more first visible primitives is affected by at least one of a video packet error, a meshlet visibility error, a meshlet atlas information error, or a meshlet level change error.

Aspect 12 may be combined with aspect 11 and includes that the meshlet visibility error or the meshlet level change error is associated with a heartbeat failure.

Aspect 13 may be combined with any of aspects 1-12 and further includes: transmitting pose information associated with the first device to a second device, where the PVS is based on a predicted pose of the pose information associated with the first device, where the first device is a client device and the second device is a server.

Aspect 14 may be combined with any of aspects 1-13 and includes that the data loss associated with the PVS or the set of video packets is associated with an expiry of a first time period.

Aspect 15 may be combined with any of aspects 1-14 and includes that the one or more first visible primitives in the previous frame are not affected by any previous data loss.

Aspect 16 may be combined with any of aspects 1-15 and includes that the PVS further includes UV mapping information.

Aspect 17 is an apparatus for graphics processing at a first device, including at least one processor coupled to a memory and, based at least in part on information stored in the memory, the at least one processor is configured to implement a method as in any of aspects 1-16.

Aspect 18 may be combined with aspect 17 and further includes a transceiver coupled to the at least one processor, where the apparatus is a wireless communication device.

Aspect 19 is an apparatus for graphics processing including means for implementing a method as in any of aspects 1-16.

Aspect 20 is a computer-readable medium (e.g., a non-transitory computer-readable medium) storing computer executable code, the code when executed by at least one processor causes the at least one processor to implement a method as in any of aspects 1-16.

Various aspects have been described herein. These and other aspects are within the scope of the following claims.

What is claimed is:

1. An apparatus for graphics processing at a first device, comprising:
   a memory; and
   at least one processor coupled to the memory and, based at least in part on information stored in the memory, the at least one processor is configured to:
      obtain a potentially visible set (PVS) and a set of video packets, wherein the PVS includes PVS information associated with a set of visible primitives that are potentially visible in a first frame, wherein the set of visible primitives corresponds to a set of meshlets, and each meshlet of the set of meshlets includes at least one visible primitive of the set of visible primitives;
      determine, if a data loss associated with the PVS or the set of video packets is detected, one or more first visible primitives in the set of visible primitives that are currently affected by the data loss associated with the PVS or the set of video packets, wherein each first visible primitive in the one or more first visible primitives is affected by at least one of a video packet error, a meshlet visibility error, a meshlet atlas information error, or a meshlet level change error;
      identify concealment information for the one or more first visible primitives in the set of visible primitives based on the one or more first visible primitives in a previous frame; and update information associated with the one or more first visible primitives based on the concealment information for the one or more first visible primitives.

2. The apparatus of claim 1, wherein one or more second visible primitives in the set of visible primitives are not currently affected by the data loss, the one or more second visible primitives are associated with one or more textures used in the first frame, the one or more textures are based on the set of video packets, and an association between the one or more textures and the one or more second visible primitives is based on a derivation of the PVS information.

3. The apparatus of claim 1, wherein the concealment information is associated with a derivation of concealment textures that represent the one or more first visible primitives in the first frame.

4. The apparatus of claim 1, the at least one processor being further configured to:
render content for the first frame based on the updated information associated with the one or more first visible primitives, the concealment information, and one or more second visible primitives in the set of visible primitives, wherein the one or more second visible primitives are not currently affected by the data loss.

5. The apparatus of claim 4, wherein the data loss associated with the PVS or the set of video packets corresponds to a reception of less than all video packets of the set of video packets or less than all PVS data packets of a set of PVS data packets associated with the one or more first visible primitives.

6. The apparatus of claim 4, the at least one processor being further configured to:
derive first texture information associated with the one or more second visible primitives based on the set of video packets, an association between the first texture information and the one or more second visible primitives being based on a derivation of the PVS information; and
store the first texture information in a texture space cache.

7. The apparatus of claim 6, wherein at least one concealment texture is associated with a texture cache lookup if there is a hit on the texture space cache, and wherein the at least one concealment texture is associated with a screen space cache lookup or an inpainting process if there is a miss on the texture space cache.

8. The apparatus of claim 1, wherein to obtain the PVS and the set of video packets, the at least one processor is configured to:
receive the PVS and the set of video packets from a server.

9. The apparatus of claim 8, wherein to receive the PVS and the set of video packets from the server, the at least one processor is configured to receive the PVS and the set of video packets from the server via one or more user datagram protocol (UDP) packets.

10. The apparatus of claim 1, wherein the meshlet visibility error or the meshlet level change error is associated with a heartbeat failure.

11. The apparatus of claim 1, the at least one processor being further configured to:
transmit pose information associated with the first device to a second device, wherein the PVS is based on a predicted pose of the pose information associated with the first device, wherein the first device is a client device and the second device is a server.

12. The apparatus of claim 1, wherein the data loss associated with the PVS or the set of video packets is associated with an expiry of a first time period.

13. The apparatus of claim 1, wherein the one or more first visible primitives in the previous frame are not affected by any previous data loss.

14. The apparatus of claim 1, wherein the PVS further includes UV mapping information.

15. The apparatus of claim 1, further comprising a transceiver coupled to the at least one processor, wherein the apparatus is a wireless communication device, wherein to obtain the PVS and the set of video packets, the at least one processor is configured to obtain the PVS and the set of video packets via the transceiver.

16. A method of graphics processing at a first device, comprising:
obtaining a potentially visible set (PVS) and a set of video packets, wherein the PVS includes PVS information associated with a set of visible primitives that are potentially visible in a first frame, wherein the set of visible primitives corresponds to a set of meshlets, and each meshlet of the set of meshlets includes at least one visible primitive of the set of visible primitives;
determining, if a data loss associated with the PVS or the set of video packets is detected, one or more first visible primitives in the set of visible primitives that are currently affected by the data loss associated with the PVS or the set of video packets, wherein each first visible primitive in the one or more first visible primitives is affected by at least one of a video packet error, a meshlet visibility error, a meshlet atlas information error, or a meshlet level change error;
identifying concealment information for the one or more first visible primitives in the set of visible primitives based on the one or more first visible primitives in a previous frame; and
updating information associated with the one or more first visible primitives based on the concealment information for the one or more first visible primitives.

17. The method of claim 16, wherein one or more second visible primitives in the set of visible primitives are not currently affected by the data loss, the one or more second visible primitives are associated with one or more textures used in the first frame, the one or more textures are based on the set of video packets, and an association between the one or more textures and the one or more second visible primitives is based on a derivation of the PVS information.

18. The method of claim 17, wherein the concealment information is associated with a derivation of concealment textures that represent the one or more first visible primitives in the first frame.

19. The method of claim 16, further comprising:
rendering content for the first frame based on the updated information associated with the one or more first visible primitives, the concealment information, and one or more second visible primitives in the set of visible primitives, wherein the one or more second visible primitives are not currently affected by the data loss.

20. The method of claim 19, wherein the data loss associated with the PVS or the set of video packets corresponds to a reception of less than all video packets of the set of video packets or less than all PVS data packets of a set of PVS data packets associated with the one or more first visible primitives.

21. The method of claim 19, further comprising:
deriving first texture information associated with the one or more second visible primitives based on the set of video packets, an association between the first texture information and the one or more second visible primitives being based on a derivation of the PVS information; and storing the first texture information in a texture space cache.

22. The method of claim 21, wherein at least one concealment texture is associated with a texture cache lookup if there is a hit on the texture space cache, and wherein the at least one concealment texture is associated with a screen space cache lookup or an inpainting process if there is a miss on the texture space cache.

23. The method of claim 16, wherein obtaining the PVS and the set of video packets further comprises:

receiving the PVS and the set of video packets from a server.

24. The method of claim 23, wherein the PVS and the set of video packets are received from the server via one or more user datagram protocol (UDP) packets.

25. The method of claim 18, wherein the meshlet visibility error or the meshlet level change error is associated with a heartbeat failure.

26. A non-transitory computer-readable medium storing computer executable code, the code, when executed by at least one processor, causes the at least one processor to:

obtain a potentially visible set (PVS) and a set of video packets, wherein the PVS includes PVS information associated with a set of visible primitives that are potentially visible in a first frame, wherein the set of visible primitives corresponds to a set of meshlets, and each meshlet of the set of meshlets includes at least one visible primitive of the set of visible primitives;

determine, if a data loss associated with the PVS or the set of video packets is detected, one or more first visible primitives in the set of visible primitives that are currently affected by the data loss associated with the PVS or the set of video packets, wherein each first visible primitive in the one or more first visible primitives is affected by at least one of a video packet error, a meshlet visibility error, a meshlet atlas information error, or a meshlet level change error;

identify concealment information for the one or more first visible primitives in the set of visible primitives based on the one or more first visible primitives in a previous frame; and update information associated with the one or more first visible primitives based on the concealment information for the one or more first visible primitives.

27. The non-transitory computer-readable medium storing computer executable code of claim 26, the code, when executed by at least one processor, further causes the at least one processor to:

render content for the first frame based on the updated information associated with the one or more first visible primitives, the concealment information, and one or more second visible primitives in the set of visible primitives, wherein the one or more second visible primitives are not currently affected by the data loss.

28. The non-transitory computer-readable medium storing computer executable code of claim 27, the code, when executed by at least one processor, further causes the at least one processor to:

derive first texture information associated with the one or more second visible primitives based on the set of video packets, an association between the first texture information and the one or more second visible primitives being based on a derivation of the PVS information; and store the first texture information in a texture space cache.

29. The non-transitory computer-readable medium storing computer executable code of claim 26, the code, when executed by at least one processor, further causes the at least one processor to:

receive the PVS and the set of video packets from a server.

30. The non-transitory computer-readable medium storing computer executable code of claim 29, wherein to receive the PVS and the set of video packets from the server, the code, when executed by at least one processor, further causes the at least one processor to receive the PVS and the set of video packets from the server via one or more user datagram protocol (UDP) packets.

* * * * *